(No Model.) 2 Sheets—Sheet 2.
R. O. WOOD.
BRAKE MECHANISM.
No. 443,028. Patented Dec. 16, 1890.
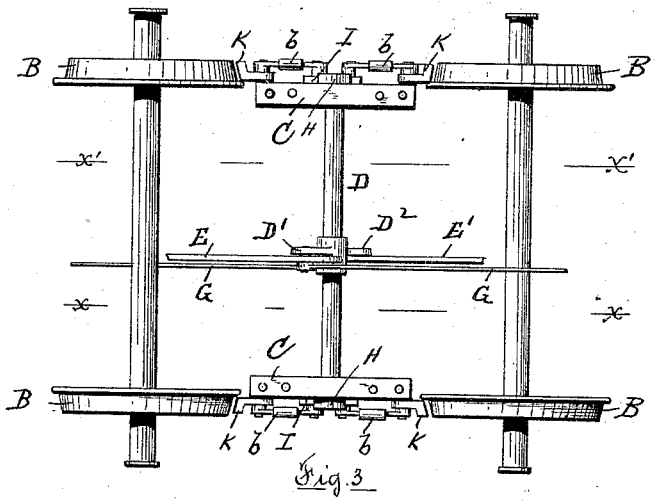
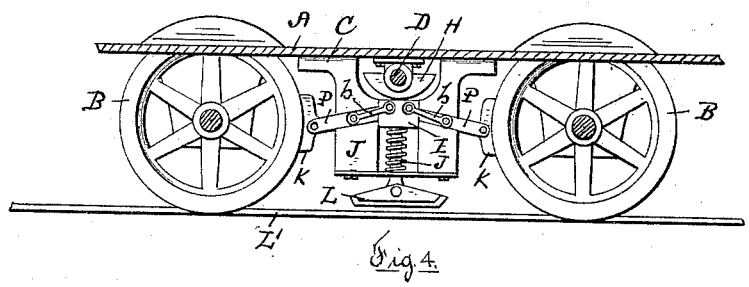
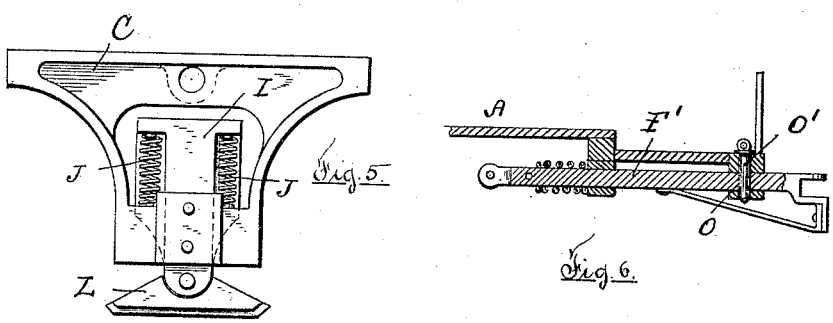
Witnesses
Walter S. Bowen
W. C. Steere
Inventor
Rosko O. Wood
By his Attorney
Rufus B. Fowler

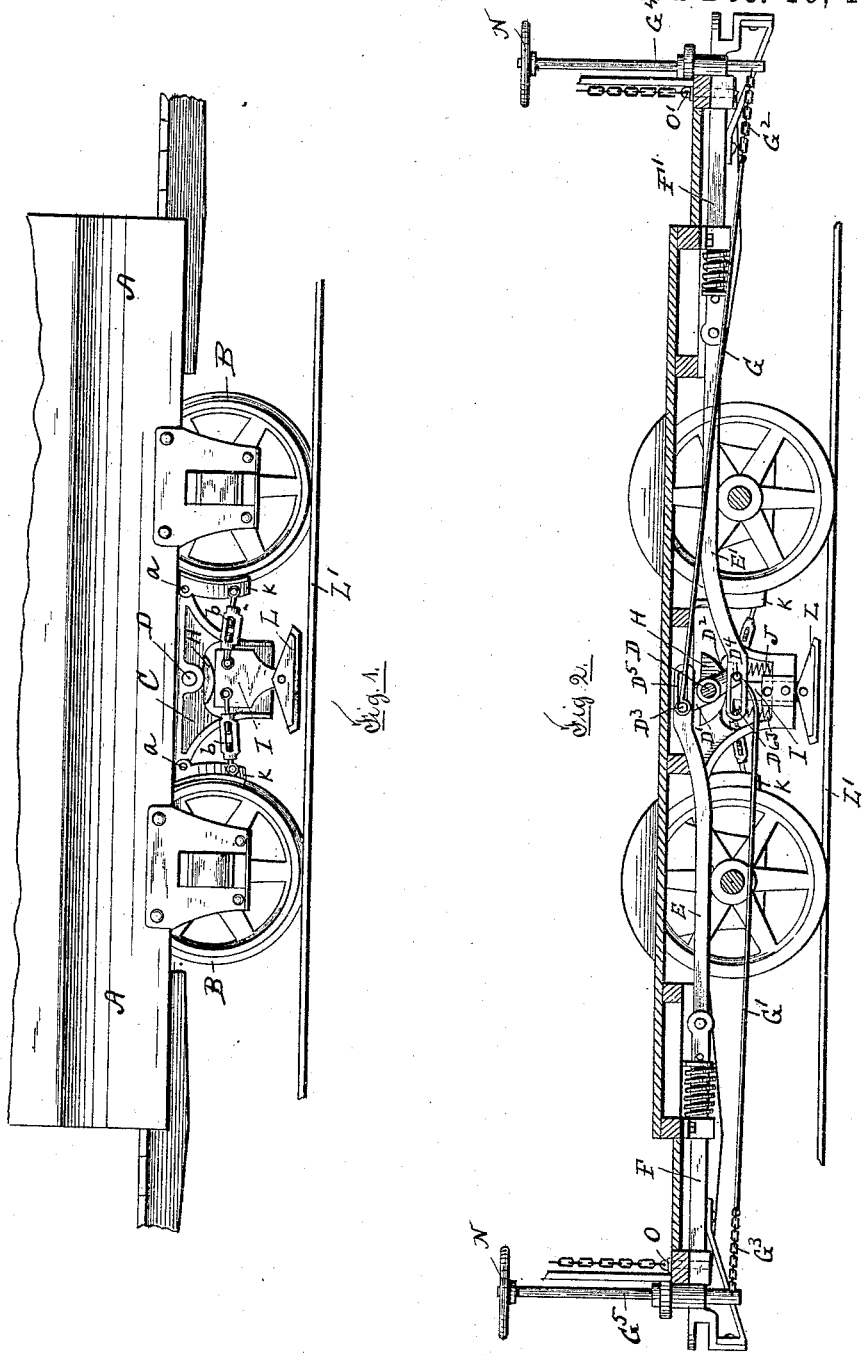

UNITED STATES PATENT OFFICE.

ROSTO O. WOOD, OF WORCESTER, MASSACHUSETTS.

BRAKE MECHANISM.

SPECIFICATION forming part of Letters Patent No. 443,028, dated December 16, 1890.

Application filed May 8, 1890. Serial No. 351,009. (No model.)

*To all whom it may concern:*

Be it known that I, ROSTO O. WOOD, a citizen of the United States, and a resident of Worcester, in the county of Worcester and State of Massachusetts, have invented a new and useful Improvement in Brake Mechanism, of which the following is a specification, accompanied by drawings forming a part of the same, and together containing a full, clear, and exact description of my invention.

Referring to the drawings, Figure 1 represents a side elevation of the truck of a car with my improved brake mechanism applied thereto. Fig. 2 is a sectional view of the same on line X X, Fig. 3. Fig. 3 is a top view of the running-gear with the brake mechanism. Fig. 4 is a sectional view on the line X X, Fig. 3, but showing a slightly-modified construction of the brake mechanism; and Fig. 5 is a slightly-enlarged view of a portion of the brake mechanism, as represented in Figs. 1, 2, and 3. Fig. 6 represents a central longitudinal sectional view of one of the draw-bars.

Similar letters refer to similar parts in the different figures.

My invention relates to a mechanism by which the brake-shoes can be applied to the wheels of a car or other vehicle either by a brakeman standing upon the platform of the car or in other convenient position or by a reversal of propelling-power as it is applied to the vehicle; and it consists in the arrangement and the construction of the several parts, as illustrated in the drawings and hereinafter described, and specifically pointed out in the subjoined claims.

In the accompanying drawings the mechanism forming the subject of my invention is represented as applied to the wheels of a street-car, as the modifications and changes in order to adapt it to other vehicles will be readily seen without detailed illustration or description.

A denotes a portion of the body of a street-car.

B denotes the wheels, and C a frame-work depending from the body and between the wheels to support the brake-operating mechanism. Journaled at each end in the frame-work C is a shaft D, having attached at its central section the radial arms $D'$ $D^2$, each of the arms $D'$ and $D^2$ carrying in their ends studs $D^3$ $D^4$, entering slots $D^5$ $D^6$ in the connecting-links E E′, which are pivoted at their opposite ends to the draw-bars F F′. Pivoted upon the studs $D^3$ $D^4$ are the rods G G′, with their opposite ends connected to the short sections of chains $G^2$ $G^3$, which are attached to the vertical shafts $G^4$ $G^5$.

Upon the ends of the shaft D and just within the frame-work C are cams H H, consisting of segments of circles, and with their curved edges bearing against a sliding block I, sliding in ways in the frame C and held against the cams H by means of the springs J J. (Represented in Figs. 2 and 5.) Brake-shoes K K are pivoted at $a$ $a$ to the frame C, and the lower ends of the brake-shoes are connected by links $b$ $b$ to the sliding blocks I I, the ends of the links pivoted to the sliding block being above a line joining the axes of the ends pivoted to the brake-shoes, so that as the sliding blocks I are forced down by the cams H H the brake-shoes will be forced against the wheels B.

Connected with the lower end of the sliding blocks I are shoes L, which as the sliding blocks I are lowered are brought against the track L′.

The operation of the brake mechanism is as follows: As the draw-bars are pushed back by the reversal of the power by which the car is drawn, as would occur upon the descent of a hill or by the stopping of the horses, in order to arrest the motion of the car, the shaft D is rocked by means of the connecting-link connected with the reversed draw-bar and the connected radial arm upon the shaft D, rocking the cams H H and pushing the sliding blocks I I downward, compressing the springs J J and carrying the brake-shoes K K against the edges of the wheels and the shoe L against the track L′. Whenever either of the radial arms $D'$ $D^2$ is actuated by its respective link the slot in the opposite link will allow an angular motion of the other radial arm without imparting motion to its connected link. In like manner the slotted ends of the links E E′ allow the shaft D to be rocked by the rotation of the vertical shafts $G^4$ $G^5$ and the winding up of the chains $G^2$ $G^3$. The vertical shafts $G^4$ $G^5$ are provided with hand-wheels N N at the upper end of the shafts in the usual manner in brake mechanisms. Each of the draw-bars F F' is provided with a hole O, in which is inserted a pin O', in order to check the rearward movement of the draw-bars when it is desired to entirely disconnect the brake mechanism, as described, from the draw-bars.

In Fig. 4 I have shown a slight modification of the device, but one that I deem to embody the essential features of my invention. Instead of hinging the brake-shoes K K to the frame by their upper ends, I connect the brake-shoes by a pivoted joint to the sliding bars P P, which are connected by the sliding block I by means of the links $b$ $b$. It will be seen that the action of the sliding blocks I I as moved by the rocking motion of the cams serves to carry the shoes K K against the edges of the wheels B through the straightening of the links $b$ $b$, which, as in the construction represented in Fig. 2, serve as the links of a "toggle-joint."

In that class of vehicles in which draw-bars are not used the rocking shaft is similarly connected with a rigid tongue, by which the backing of the team will cause a rocking motion to be imparted to the rocking shaft in the manner already described.

By the mechanism above described the force of the driver can be applied to the rocking shaft D independently of or supplementary to the force exerted through the draw-bar in the manner described.

In the construction represented in Fig. 4 the sliding block I is provided with a stem I', to which the track-shoe L is connected, and which is inclosed by a spring J, while in the construction represented in Figs. 2 and 5 the springs are held in a recess in the frame C. The action of the springs in both cases is, however, substantially the same, its tension in both cases serving to hold the sliding block against the edge of the cam.

What I claim as my invention, and desire to secure by Letters Patent, is—

1. In a brake mechanism, the combination, with the brake-shoes and a draw-bar by which the vehicle is drawn, of a rocking shaft journaled in bearings transversely to the vehicle, said rocking shaft being operatively connected with said draw-bar, substantially as described, and cams carried on said shaft and actuating said brake-shoes through intermediate mechanism, substantially as described.

2. In a brake mechanism, the combination, with a draw-bar by which the vehicle is drawn, of a connecting-link pivoted at one end to said draw-bar, said link being provided with a slot at its opposite end, a rocking shaft journaled in bearings transversely to the vehicle, a radial arm attached to said rocking shaft and carrying a stud held in said slotted end of said link, cams attached to said rocking shaft, brake-shoes arranged to be applied to the periphery of the wheels of the vehicle, and intermediate mechanism by which the rocking movement of the cams is made to carry the brake-shoes against the periphery of the wheels, substantially as described.

3. In a brake mechanism, the combination of a draw-bar by which the vehicle is drawn, a horizontal shaft journaled in bearings transversely to the vehicle and operatively connected with said draw-bar, substantially as described, whereby the reversal of the draw-bar is made to rock said shaft, cams attached to said rocking shaft, sliding blocks actuated by said cams, brake-shoes arranged to bear against the periphery of the wheels of the vehicle, and links connecting said sliding blocks and said brake-shoes, whereby said brake-shoes are carried against the periphery of the wheels as the sliding blocks are actuated by said cams, substantially as described.

4. In a brake mechanism, the combination of a rocking shaft journaled in bearings transversely to the vehicle, a radial arm attached to said shaft by which it is rocked through the connected operative mechanism, substantially as described, cams carried by said shaft, sliding blocks sliding in ways and actuated by said cams, brake-shoes hinged to the frame-work of the vehicle, and links connecting said sliding blocks with the brake-shoes, substantially as described.

5. In a brake mechanism, the combination of a rocking shaft journaled in bearings transversely to the vehicle, cams carried on said shaft, sliding blocks actuated by said cams in one direction to carry the brake-shoes against the wheels of the vehicle, springs held in the frame-work of the vehicle with their tension applied to reverse the motion of said sliding blocks and hold them against the cams, brake-shoes arranged to bear against the periphery of the wheels, and links connecting said brake-shoes and said sliding blocks by which said brake-shoes are thrust against the wheels by the movement of the sliding blocks as they are actuated by said cams, substantially as described.

6. In a brake mechanism, the combination of a rocking shaft journaled in bearings transverse to the vehicle, cams carried on said shaft at each end thereof, brake-shoes arranged to bear against the periphery of the wheels of the vehicle and operatively connected with said cams through intermediate mechanism, substantially as described, a radial arm attached to said shaft, a draw-bar by which the vehicle is drawn, a connecting-link between said radial arm and said draw-bar, said link being provided with a slot permitting an independent motion of the radial arm, and a rod pivoted to said radial arm by which the shaft can be rocked independently of or in conjunction with the motion of the draw-bar, substantially as described.

7. In a brake mechanism, the combination of a draw-bar by which the vehicle is drawn, a horizontal shaft journaled in bearings transversely to the vehicle and operatively connected with said draw-bar, substantially as described, whereby the reversal of the draw-bar is made to rock said shaft, cams attached to said rocking shaft, sliding blocks actuated by said cams, and brake-shoes carried by said sliding blocks, whereby a frictional resistance is applied to the track, substantially as described.

8. In a brake mechanism, the combination of a rocking shaft, cams carried by said rocking shaft, sliding blocks actuated by said cams, brake-shoes carried by said sliding blocks, whereby a frictional resistance is applied to the track, and springs applied to said sliding blocks to withdraw said brake-shoes from the track, substantially as described.

9. In a brake mechanism, brake-shoes arranged to bear against the periphery of the wheels of the vehicle, a draw-bar capable of a sliding motion by which the brake-shoes are actuated through the intermediate mechanism, substantially as described, said draw-bar being provided with a hole to receive a stop-pin, and a stop-pin held in the fixed portion of the vehicle and entering said hole to prevent the sliding motion of the draw-bar, all arranged and combined substantially as described.

Dated at Worcester, in the county of Worcester and State of Massachusetts, the 2d day of May, 1890.

ROSTO O. WOOD.

Witnesses:
 J. B. WOOD,
 NATHAN MAY.